United States Patent
Makino et al.

(10) Patent No.: US 9,115,674 B2
(45) Date of Patent: Aug. 25, 2015

(54) FUEL VAPOR PROCESSING DEVICES

(75) Inventors: Katsuhiko Makino, Obu (JP); Shota Yamanaka, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 783 days.

(21) Appl. No.: 13/411,792

(22) Filed: Mar. 5, 2012

(65) Prior Publication Data
US 2012/0222656 A1 Sep. 6, 2012

(30) Foreign Application Priority Data
Mar. 4, 2011 (JP) ................. 2011-047126

(51) Int. Cl.
F02M 33/06 (2006.01)
F02M 25/08 (2006.01)
B01D 53/04 (2006.01)

(52) U.S. Cl.
CPC ....... *F02M 25/0854* (2013.01); *B01D 53/0438* (2013.01); *B01D 2253/102* (2013.01); *B01D 2259/402* (2013.01); *B01D 2259/4516* (2013.01); *F02M 2025/0881* (2013.01)

(58) Field of Classification Search
CPC ............... B01D 53/0438; B01D 2253/102; B01D 2259/4516; F02M 2025/0881; F02M 25/0854
USPC ............. 123/516–521, 543–549; 96/126, 146
See application file for complete search history.

(56) References Cited

U.S. PATENT DOCUMENTS

| | | | |
|---|---|---|---|
| 5,377,644 A * | 1/1995 | Krohm ........................ | 123/520 |
| 6,701,902 B2 * | 3/2004 | Koyama et al. ............ | 123/519 |
| 6,769,415 B2 * | 8/2004 | Reddy et al. ............... | 123/519 |
| 7,323,041 B2 * | 1/2008 | Yoshida et al. ............ | 96/132 |
| 7,448,366 B2 * | 11/2008 | Potier et al. ............... | 123/519 |
| 7,841,321 B2 * | 11/2010 | Kosugi et al. ............. | 123/519 |
| 8,375,925 B2 * | 2/2013 | Ichikawa et al. .......... | 123/519 |
| 8,440,005 B2 * | 5/2013 | Lang et al. ................. | 96/126 |
| 8,685,152 B2 * | 4/2014 | Eschlbeck et al. ......... | 96/146 |
| 2004/0094132 A1 * | 5/2004 | Fujimoto et al. ........... | 123/519 |
| 2009/0320805 A1 * | 12/2009 | Lang et al. ................. | 123/518 |
| 2011/0247592 A1 * | 10/2011 | Kim et al. .................. | 123/519 |
| 2013/0319249 A1 * | 12/2013 | Shinagawa .................. | 96/146 |

FOREIGN PATENT DOCUMENTS

| | | | | |
|---|---|---|---|---|
| JP | 2003-227420 | | 8/2003 | |
| JP | 2003-278611 | | 10/2003 | |
| JP | 2003278611 A | * | 10/2003 | ............. F02M 25/08 |

* cited by examiner

*Primary Examiner* — Thomas Moulis
*Assistant Examiner* — Elizabeth Hadley
(74) *Attorney, Agent, or Firm* — Ladas & Perry LLP

(57) ABSTRACT

One aspect according to the present teachings includes a fuel vapor processing device including a housing having a first port for introduction of fuel vapor, a second port for introduction of negative pressure, and a third port communicating with an atmosphere. An adsorption material is disposed within the housing. In a desorption mode, fuel vapor desorbed by the adsorption material is desorbed from the adsorption material as air flows into the housing via the third port and flows out of the second port. A plurality of heaters are disposed within the housing and are arranged along a path of flow of air from the third port to the second port in the adsorption mode. A controller controls the heaters such that the heaters start to heat the adsorption material in order of the air flow direction from the third port to the second port. The controller preferably also terminates heating of the adsorption material in the same manner.

16 Claims, 3 Drawing Sheets

FUEL VAPOR PROCESSING DEVICES

This application claims priority to Japanese patent application serial number 2011-047126, the contents of which are incorporated herein by reference.

BACKGROUND OF THE INVENTION

Field of the Invention

Embodiments of the present invention relate to fuel vapor processing devices having adsorption materials disposed therein for adsorbing fuel vapor, e.g., gasoline vapor, that may be produced in fuel tanks.

In general, vehicles that run on fuel, such as gasoline, are equipped with fuel vapor processing devices. The fuel vapor processing device can adsorb fuel vapor produced in a fuel tank. Adsorption of fuel vapor produced in the fuel pump can prevent potential damage to the fuel tank that may be caused due to the increase in the internal pressure of the fuel tank. In addition, it is possible to prevent fuel vapor from dissipating to the atmosphere. Typically, a fuel vapor processing device has a hollow container like configuration and includes a housing having an adsorption material filled therein. The housing has a tank port for introduction of fuel vapor produced within the fuel tank, a purge port communicating with an intake air pipe of an internal combustion engine of the vehicle, and an atmospheric port for introduction of atmospheric air. The adsorption material can adsorb fuel vapor and allow desorption of fuel vapor. In general, the adsorption material may be activated carbon or other similar material. Therefore, during stopping of the vehicle engine or the like, fuel vapor produced in the fuel tank may flow into the fuel vapor processing device, so that the fuel vapor may be temporarily adsorbed by the adsorption material. As the engine is restarted, the atmospheric air may be introduced into the fuel vapor processing device, so that the fuel vapor adsorbed by the adsorption material can be desorbed and introduced into the intake air pipe of the engine (purge process).

Typically, the adsorption material has such a characteristic that the amount of adsorption of a specific component (fuel vapor in this case) decreases as the temperature increases. Conversely, the amount of adsorption of the specific component increases as the temperature decreases. Therefore, it may be preferable that the temperature be as high as possible during desorption of fuel vapor from the adsorption material. However, as the fuel vapor is desorbed from the adsorption material, the temperature of the adsorption material may decrease due to the evaporation of heat. Therefore, the desorption efficiency of the adsorption material may decrease as the desorption of fuel vapor progresses. In order to solve this problem, Japanese Laid-Open Patent Publication No. 2003-278611 has proposed a fuel vapor processing device that has a plurality of heaters disposed within a housing and arranged along a direction of flow of fuel vapor from an atmospheric port to a purge port. The heaters may heat the adsorption material during the desorption process, so that the desorption efficiency can be improved. In addition, this publication attempts to minimize the time necessary for the purge operation and to save the electrical power consumption of the heaters. They are configured such that they are consecutively turned on starting from the heater positioned nearest the purge port. Conversely, they are turned off in a consecutive fashion beginning with the heater nearest the atmospheric port.

However, in the case of the fuel vapor processing device of the above publication, the heaters positioned nearest the purge port initially generate heat, and therefore, fuel vapor is desorbed from a part of the adsorption material positioned around this heater earlier than the other parts of the adsorption material. Because the heater positioned on the side of the purge port is the last one to be stopped, this heater may continue to heat a part of the adsorption material even after fuel vapor has been already desorbed from this part. This may result in the unnecessary consumption of the electric power. In addition, because the amount of desorption of fuel vapor may substantially change in accordance with the on and off operation of the heaters, it may be possible that the air/fuel ratio of the fuel mixture supplied to the engine becomes unstable during introduction of the desorbed fuel into the engine.

Therefore, there has been a need in the art for a fuel vapor processing device that can reduce the heater energy consumption necessary for desorption of fuel vapor.

SUMMARY OF THE INVENTION

One aspect according to the present teachings includes a fuel vapor processing device having a housing with a first port for introduction of fuel vapor, a second port for introduction of negative pressure, and a third port communicating with the atmosphere. An adsorption material is disposed within the housing. In the desorption mode, fuel vapor adsorbed by the adsorption material is desorbed from the adsorption material as air flows into the housing via the third port and flows out of the second port. A plurality of heaters are disposed within the housing and are arranged along the air flow path travelling from the third port to the second port. A controller controls the heaters such that the heaters start to heat the adsorption material sequentially from the third port to the second port and the heaters stop heating the adsorption material in the same sequential manner.

DETAILED DESCRIPTION OF THE INVENTION

Figure 1:
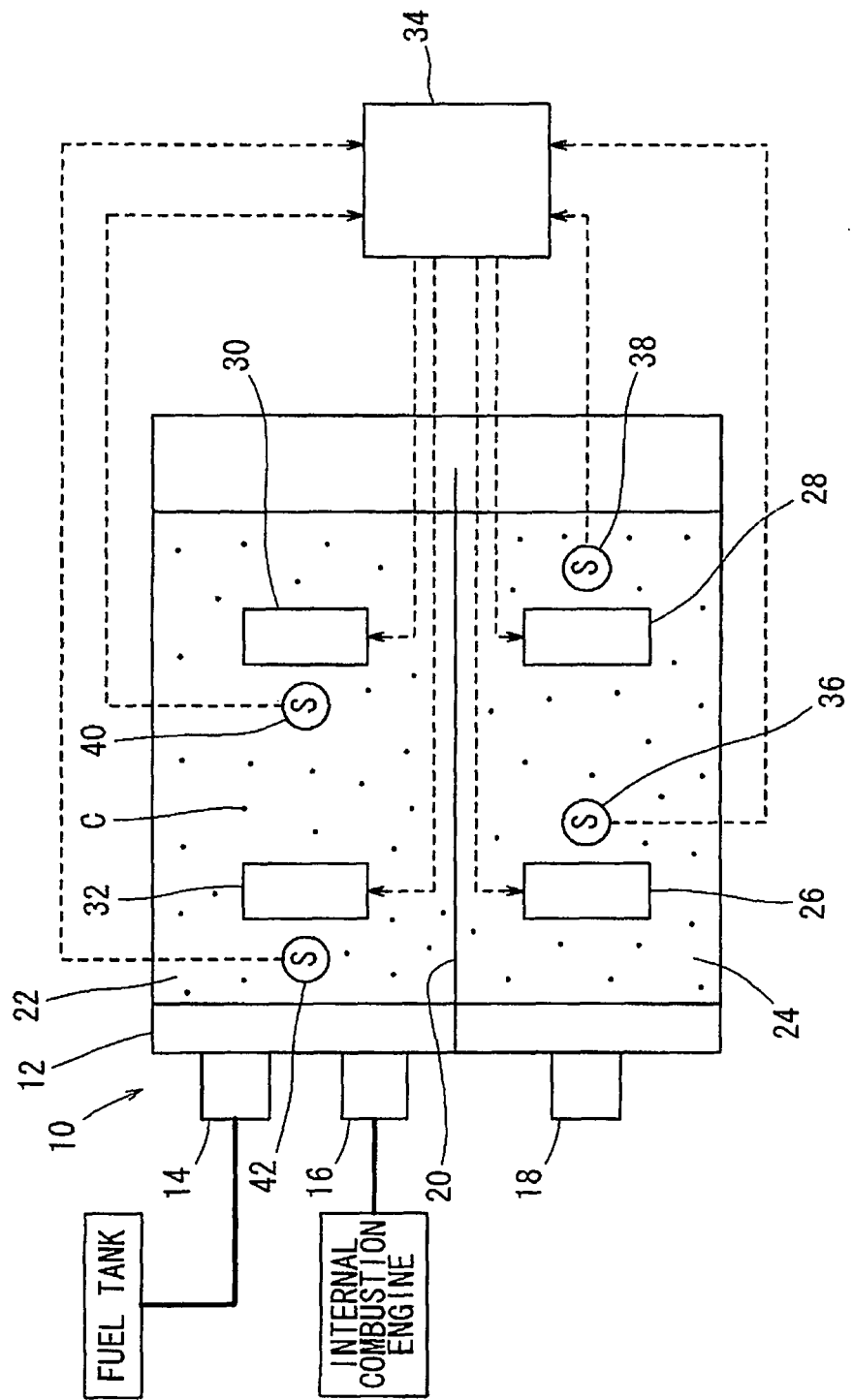
FIG. 1 is a schematic view of a fuel vapor processing device.

Each of the additional features and teachings disclosed above and below may be utilized separately or in conjunction with other features and teachings to provide improved fuel vapor processing devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one example, a fuel vapor processing device includes a housing that includes a tank port communicating with a fuel tank, a purge port communicating with an intake air pipe of an internal combustion engine, and an atmospheric port communicating with the atmosphere. The housing is filled with adsorption material capable of adsorbing and desorbing fuel vapor. A plurality of heaters for heating the adsorption material are preferably arranged along a flow path from the atmospheric port to the purge port. During a purge operation, the electric power is supplied sequentially to the heaters from the atmospheric port side to the purge port side. The electric supply to the heaters is preferably later terminated in a sequential manner from the atmospheric side to the purge port side.

Normally, the amount of fuel vapor adsorbed by the adsorption material may decrease as the temperature increases. Therefore, desorption of fuel vapor from the adsorption material may be promoted by heating the adsorption material. However, when fuel vapor has been desorbed from a part of the adsorption material, the desorbed fuel vapor may be again adsorbed by the same part of the adsorption material. Therefore, when a fuel vapor processing device is purged, it may be preferable that the desorption of fuel vapor occurs from on end of the adsorption material to its other end. Such a path preferentially coincides with the air flow path from the atmospheric port to the purge port. With the above fuel vapor processing device, the electric power is in turn supplied to the heaters in order from the atmospheric port side to the purge port side. In this way, it is possible to minimize fuel vapor from being re-adsorbed by the same part of the adsorption material after it has been desorbed. As a result, it is possible to complete the desorption of fuel vapor from the adsorption material efficiently and in a short period of time. In addition, because the supply of the electric power to the heaters is stopped sequentially from the atmospheric port side to the purge port side, the heaters are stopped sequentially as the desorption from the adjacent adsorption material is completed. In this way, it is possible to efficiently heat and cool the adsorption material. As a result, it is possible to reduce the amount of the electric power necessary for the purge operation.

A value of the electric power supplied to one of the heaters positioned closest to the purge port may be smaller than a value of the electric power supplied to the other heaters.

During a purge operation heaters heat up the adsorption material. Often, a part of the fuel vapor desorbed from a part of the adsorption material may be again adsorbed by a different part of the adsorption material. This re-adsorption typically occurs in adsorption material located on a downside stream of the airflow. The airflow stream flows from an upside at the atmospheric port towards the downside at the purge port. However, as the adsorption material is heated by the heater positioned closest to the purge port, a larger amount of fuel vapor is desorbed and discharged from the purge port in comparison with the amount of fuel vapor desorbed due to the heat of each of the other heaters. The amount of the electric power supplied to one of the heaters positioned closest to the purge port may be smaller than the value of the electric power supplied to the other heaters. In this way, the heater positioned closest to the purge port can be prevented from heating up as it normally would. This would result in a comparative decrease in the desorption of fuel vapor. Thus, the amount of desorption from the material near the purge port heater more closely matches the amounts desorbed from material near the other heaters. Hence, the amount of fuel vapor supplied from the fuel vapor processing device to the intake air pipe of the internal combustion engine can be substantially constant. As a result, it is possible to inhibit any abrupt change in the fuel mixture fuel/air ratio supplied to the engine.

The fuel vapor processing device may further include a detecting device configured to detect the desorption condition of fuel vapor within the housing. Furthermore, the fuel vapor processing device may supply electric power to the different heaters based on the desorption condition detected.

With this arrangement, the timings of and amount of electric power supplied to the individual heaters can be altered based on the detected desorption condition. In this way, it is possible to prevent a part of the adsorption material, from which fuel vapor has been completely desorbed, from being heated again by the corresponding heater. As a result, it is possible to reduce the amount of electric power necessary for desorption of fuel vapor.

The detecting device may include concentration sensors each capable of detecting a concentration of fuel vapor or temperature sensors each capable of detecting a temperature at a position around each of the heaters.

In this case, it is possible to determine the relative completion of desorption of fuel vapor from different parts of the adsorption material based on the concentration of the fuel vapor detected by the concentration sensors and/or the temperature detected by the temperature sensors. The concentration of fuel vapor or the temperature of the adsorption material may give a reliable indication in determining the relative completion of desorption of fuel vapor during a purge operation. Using such measurements, it is possible to accurately determine the completeness of fuel vapor desorption in the adsorption material.

In certain embodiments, a timer may be used to determine when to supply and/or cut off electric power to each of the heaters.

In such a case, the supply of electric power to each of the heaters can be started and stopped according the timings set by the timer. Thus, by measuring the time necessary for heating by each of the heaters and setting the timings of starting and stopping the supply of electric power to the timer based on the measured times, it is possible to further efficiently perform the fuel desorbing operation.

It is possible that different heaters receive different amounts of electric power. It's also possible that one or more heaters receive no electric power while other heaters receive electric power. With this arrangement, it is possible to concentrate the electric power in any of the heaters. In such a way, it is possible to heat a certain area of the adsorption material to a temperature that is higher than it would be possible when the same electric power is shared between two or more heaters.

Representative examples will now be described with reference to the drawings. The representative examples relate to fuel vapor processing devices that can preferably be mounted to automobiles or other structures for processing fuel vapor (gasoline vapor) produced in fuel tanks.

FIG. 1 shows a fuel vapor processing device 10. The fuel vapor processing device 10 includes a housing 12 configured as a hollow container. The housing 12 has a tank port 14 which communicates with the fuel tank and the inside of the housing 12. A purge port 16 communicates with an intake air pipe (not shown) of an internal combustion engine (not shown) and the inside of the housing 12. Finally, an atmospheric port 18 communicates with the atmosphere and the inside of the housing 12. The tank port 14, the purge port 16 and the atmospheric port 18 are preferably arranged in series on one side of the housing 12.

The inside of the housing 12 is separated into a main chamber 22 and an auxiliary chamber 24 by a partition wall 20. The main chamber 22 and the auxiliary chamber 24 are filled with an adsorption material C. Any kind of porous material may be used for the adsorption material. It is preferred that the adsorption material allows passage of air and is capable of adsorption and desorption of fuel vapor. It is further contemplated that while "adsorption" and "desorption" are used for embodiments of the invention, that "sorption" is contemplated by the terms. Sorption is used to include adsorption, absorption, ion exchange and the reverse equivalents of such processes. Consequently, "adsorption" refers to adsorption, absorption, ion exchange, etc. Desorption, meanwhile, refers to the de-adsorption, de-absorption as well as ion re-exchange, etc. The composition and the configuration of the adsorption material C can be suitably selected. For example, the adsorption material C may be activated carbon. The adsorption material C placed into the main chamber 22 may be the same or different from the adsorption material C placed into the auxiliary chamber 24.

The atmospheric port 18 may be disposed on the side of the auxiliary chamber 24 to communicate with the auxiliary chamber 24 and the atmosphere. The tank port 14 and the purge port 16 may be disposed on the side of the main chamber 22. The tank port 14 preferably communicates with the main chamber 22 and the fuel tank. The purge port 16 preferably communicates with the main chamber 22 and the intake air pipe of the internal combustion engine.

The main chamber 22 and the auxiliary chamber 24 communicate with each other via a communication passage, so that a flow path having a U-shape configuration extends from the atmospheric port 18 to both the tank port 14 and the purge port 16. As a fuel vapor is introduced into the housing 12, the adsorption materials C disposed within the housing 12 can adsorb the fuel vapor. Remaining gas may flow through the main chamber 22 and the auxiliary chamber 24 and may be thereafter discharged to the atmosphere. During a purge operation, air is introduced into the housing 12 via the atmospheric port 18 and then flows through the auxiliary chamber 24 and the main chamber 22. As the air flows through the auxiliary chamber 24 and the main chamber 22, fuel vapor adsorbed by the adsorption materials C may be desorbed from the adsorption materials C. Thereafter it may travel along with the air via the purge port 16 to the intake air pipe of the internal combustion engine.

As the temperature of the adsorption material C decreases, the amount of adsorption of a specific component (fuel vapor in this case) increases. Conversely, as the temperature increases, the amount of adsorption decreases. Therefore, during the purge operation, as the temperature increases, the amount of fuel vapor desorption increases. For this reason, it may be preferable that the temperature of the adsorption material is set to be as high as possible during the purge operation. However, desorption of the fuel vapor is an endothermic reaction. Therefore, as the desorption process proceeds, the temperature of the adsorption material C may be decreased to lower the desorption efficiency. A single or plurality of heaters may be disposed within the housing 12. In one embodiment, a first heater 26, a second heater 28, a third heater 30 and a fourth heater 32 are disposed within the housing 12 for heating the adsorption materials C. The first and second heaters 26 and 28 are disposed within the auxiliary chamber 24, while the third and fourth heaters 30 and 32 are disposed within the main chamber 22. The first, second, third and fourth heaters 26, 28, 30 and 32 are sequentially arranged along a direction of flow of air during the purge operation. In other words, the first, second, third and fourth heaters 26, 28, 30 and 32 are sequentially arranged along a direction from the atmospheric port 18 toward the purge port 16. A controller 34 may control the first, second, third and fourth heaters 26, 28, 30 and 32 together or separately from each other.

A first concentration sensor 36, a second concentration sensor 38, a third concentration sensor 40 and a fourth concentration sensor 42 may be disposed within the housing 12 for measuring the concentration of the fuel vapor flowing through the housing 12. The first and second concentration sensors 36 and 38 may be disposed within the auxiliary chamber 24, while the third and fourth concentration sensors 40 and 42 may be disposed within the main chamber 22. Similar to the first, second, third and fourth heaters 26, 28, 30 and 32, the first, second, third and fourth concentration sensors 36, 38, 40 and 42 may be arranged sequentially along the air flow direction during the purge operation. More specifically, the first concentration sensor 36 is positioned proximal to the first heater 26 on its downstream side. The upstream and downstream sides are defined with respect to the direction of air flow during the purge operation. Similarly, the second concentration sensor 38 may be positioned proximal to the second heater 28 on its downstream side, the third concentration sensor 40 positioned proximal to the third heater 30 on its downstream side, and the fourth concentration censor 42 proximal to the fourth heater 32 on its downstream side. The concentration values (detection signals) detected by the first to fourth concentration sensors 36, 38, 40 and 42 may be input to the controller 34. The first to fourth concentration sensors 36, 38, 40 and 42 may serve as detecting devices for detecting desorption conditions of fuel vapor. It is also contemplated that a single sensor be used which is capable of making multiple detections.

The controller 34 may include a central processing unit (CPU), a read only memory (ROM), a random access memory (RAM), etc. The ROM may store a predetermined control program, and the CPU may control various components of the fuel vapor processing device 10 according to a control program.

The operation of an embodiment of the fuel vapor processing device 10 will now be described. When the internal combustion engine is stopped, it is preferred that no electric power is supplied to the first to fourth heaters 26, 28, 30 and 32. During this stage, the fuel vapor containing gas containing fuel vapor produced in the fuel tank flows into the housing 12 via the tank port 14. Therefore, the fuel vapor may be adsorbed by the adsorption materials C. The remaining gas which contains largely air may be discharged. It may flow through the main chamber 22 and the auxiliary chamber 24 to the atmospheric port 18 where it is then discharged into the atmosphere.

When the engine is started, negative pressure is produced in the intake air pipe causing fluid flow from the atmospheric port 18 toward the purge port 16 in the housing 12. Air may be introduced into the housing 12 via the atmospheric port 18 and may flow through the auxiliary chamber 24 and the main chamber 22. Hence, fuel vapor adsorbed by the adsorption materials C can be desorbed. The desorbed fuel vapor may be discharged from the purge port 16 along with the air and may thereafter flow into the intake air pipe.

At the beginning of the purge operation, electric power may be supplied to the first heater 26, so that the first heater 26 heats a part of the adsorption material C positioned proximal to the first heater 26. The supply of electric power is in turn supplied sequentially from the first heater 26 to the fourth heater 32.

Electric power may be alternatively supplied to the different heaters. Such supply of electric power may be determined by vapor concentration sensors placed on or near the heaters and/or absorption materials C.

Thus, during the supply of the electric power to the first heater 26, the first concentration sensor 36 may measure the concentration of the fuel vapor flowing through the housing 12 at a position around the first concentration sensor 36. The concentration of the fuel vapor desorbed from a part of the adsorption material C positioned on the upstream side of the first concentration sensor 36 is input to the controller 34. When the measured value of the first concentration sensor 36 has reached a first predetermined value (preferably zero), the controller 34 stops the supply of the electric power to the first heater 26. Simultaneously, or shortly thereafter, the controller 34 may begin to supply electric power to the second heater 28. Similarly, the second concentration sensor 38 measures the concentration of the fuel vapor flowing through the housing 12 at a position around the second concentration sensor 38, and inputs it into the controller 34. When the measured value of the second concentration sensor 38 has reached a second predetermined value (preferably zero), the controller 34 stops the supply of the electric power to the second heater 28, and simultaneously or shortly thereafter, the controller 34 begins to supply the electric power to the third heater 30. The third concentration sensor 40 measures the concentration of the fuel vapor flowing through the housing 12 at a position around the third concentration sensor 40, and inputs it into the controller 34. When the measured value of the third concentration sensor 40 has reached a third predetermined value (preferably zero), the controller 34 stops the supply of the electric power to the third heater 30, and simultaneously or shortly thereafter, the controller 34 begins to supply electric power to the fourth heater 32. The fourth concentration sensor 42 measures the concentration of the fuel vapor flowing through the housing 12 at a position around the fourth concentration sensor 42 and inputs it into the controller 34. When the measured value of the fourth concentration sensor 42 has reached a fourth predetermined value (preferably zero), the controller 34 stops the supply of the electric power to the fourth heater 32. In this way, the supply of electric power to the first to fourth heaters 26, 28, 30 and 32 is switched sequentially from one to another. Because the concentration of the fuel vapor provides a reliable indication for determining completion of desorption of the fuel vapor, it is possible to accurately determine the completion percentage of desorption of the fuel vapor by using the concentration sensors.

Figure 2:
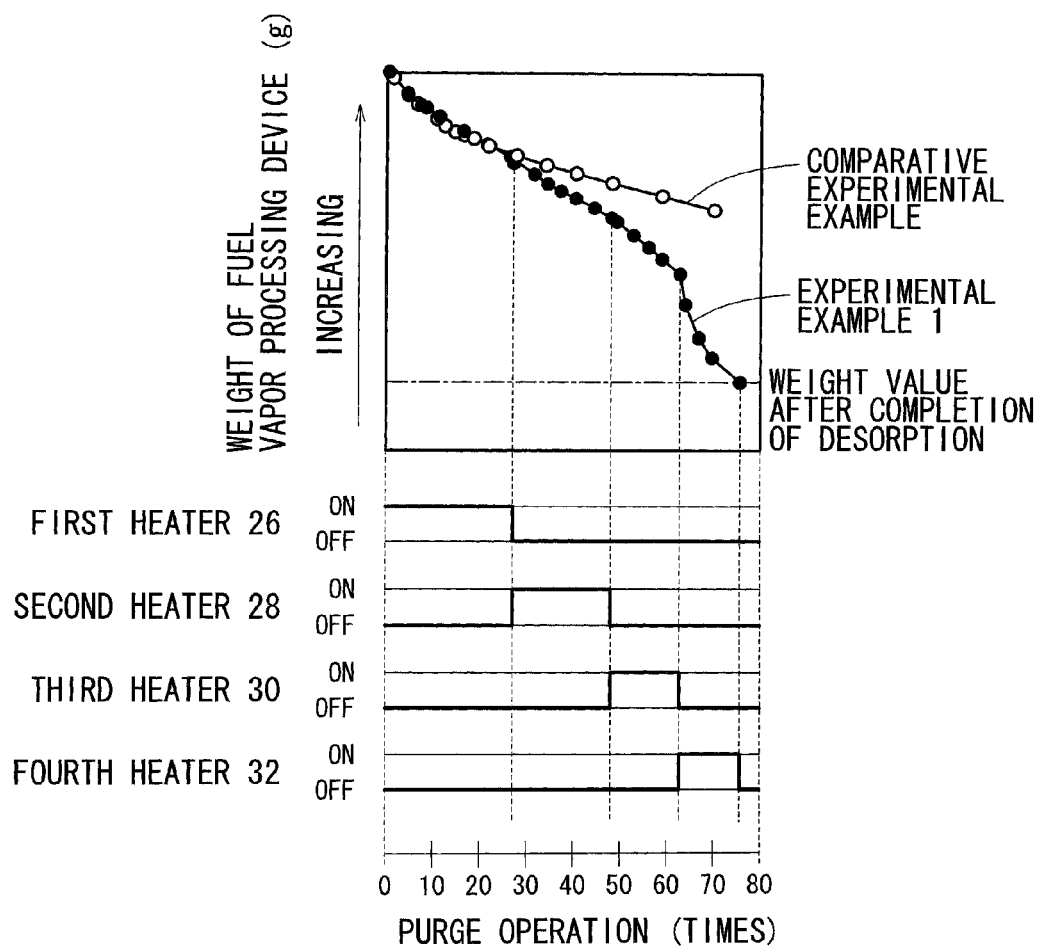
FIG. 2 is a graph showing the relationship between the number of purging operations, the operation timings of heaters and the weight of the fuel vapor processing device for an experimental example 1 and a comparative experimental example.

The change in the amount of desorption of fuel vapor achieved by in turn switching the supply of the electric power from amongst the first to fourth heaters will now be described with reference to FIG. 2. The following experiments were made. First, fuel vapor (gasoline vapor) was introduced from the tank port 14 into the housing 12 for desorption of the fuel vapor by the adsorption materials C disposed within the housing 12. For the experiments, activated carbon "BAX-1500" available from MeadWestvaco Corporation was used as the adsorption materials C. Thereafter, a given amount of air was introduced from the atmospheric port 18 into the housing 12 for purging the adsorption materials C. This purge operation was repeated by a number of times, and the weight of the fuel vapor processing device 10 was calculated after each time the purge operation is made. The experiments were made both for the case where the electric power of 15 W is simultaneously supplied to each of the first to fourth heaters 26, 28, 30 and 32 (Comparative Experimental Example) and for the case where the electric power of 60 W is supplied so as to be in turn switched from one of the first to fourth heaters 26, 28, 30 and 32 to the other (Experimental Example 1). FIG. 2 shows the results of these experiments. In FIG. 2, "WEIGHT VALUE AFTER COMPLETION OF DESORPTION" means the weight of the fuel vapor processing device 10 after the total amount of fuel vapor that can be desorbed has been completely desorbed. In other words, "WEIGHT VALUE AFTER COMPLETION OF DESORPTION" means the weight of the fuel vapor processing device 10 before introduction of fuel vapor into the fuel vapor processing device 10. The timing chart at the lower portion of FIG. 2 shows various timings of switching from "ON" to "OFF of the heaters in the case of Experimental Example 1. It should be noted that the resulting weight fuel vapor processing device decreased after successive purge operations. It is envisioned that they could be embodiments using different adsorption materials and chemicals wherein the sorption by-product could conversely result in an increased weight in the fuel vapor processing device after successive purge operations.

As a result of the experiments, the desorption in the case of Experimental Example 1 was completed earlier than in the case of Comparative Experimental Example. A total of 60 W of electric power was supplied in both the Experimental Example 1 and Comparative Experimental Example. A heater receiving the entire 60 W of electric power can heat a part of the adsorption material C positioned around the heater to a higher temperature than that achievable by a heater receiving just the 15 W of electric power, so that desorption of fuel vapor from the part of the adsorption material C around the heater can be promoted. For this reason, if the total consumption of electric power is the same, the desorption efficiency is higher when the total amount of power is consecutively applied to different heaters rather than when the power is supplied equally to all of the heaters. In addition, by changing the heating position in turn from one area to another, it is possible to minimize the time necessary for completing desorption. It is also possible to eliminate the inefficient use of electric power in heating parts of the adsorption material from which desorption of fuel vapor has already been completed. In this way, it is possible to maximize the efficiency of the electric power necessary for desorption.

Other embodiments will now be described. Embodiments of these fuel vapor processing devices differ from previous embodiments by way of the control of the heaters.

In the previously described embodiments, electric power is generally provided sequentially from the first to fourth heaters 26, 28, 30 and 32. It is preferred that the heating begins with a heater positioned on the side of the atmospheric port 18 and ends with a heater positioned on the side of the purge port 16. In addition, the same amount of electric power is supplied to each of the heaters 26, 28, 30 and 32. However, when the same amount of electric power is in turn supplied to the heaters 26, 28, 30 and 32, it may be possible that the amount of the fuel vapor desorbed and discharged from the fourth heater 32 is larger than that of the fuel vapor desorbed from any one of the first to third heaters 26, 28 and 30. This occurs because the fuel vapor desorbed from a part of the adsorption material C positioned around each of the first to third heaters 26, 28 and 30 may be re-adsorbed by a different part of the adsorption material C positioned on its downstream side (on the side of the purge port 16). Later, substantially all the fuel vapor desorbed from a part of the adsorption material C positioned around the fourth heater 32 may be discharged from the fuel vapor processing device 10. The situation is similar to that of an avalanche where some of the kinetic energy from an above location is passed to that of a downstream location. In this situation, a small amount of re-adsorbed fuel vapor is passed from the first heater to the second heater, etc. The amount of re-adsorbed fuel vapor is greatest in the last heater and resultingly, it is from this area of the adsorption material C that the amount of desorption may be the greatest. The fuel vapor purged from the fuel vapor processing device 10 flows into the intake air passage of the internal combustion engine, and therefore, if the amount of the desorbed fuel vapor abruptly increases as in the experimental example 1 shown in FIG. 2, the air/fuel ratio of the fuel mixture supplied to the internal combustion engine may be abruptly changed. Because the air/fuel ratio may influence the driving efficiency of the internal combustion engine and the amount of contaminant contained in the exhaust gas, it may be preferable that the air/fuel ratio is maintained at a more consistent ratio.

Therefore, in other fuel vapor processing device 10 embodiments, the controller 34 may limit the electric power supplied to the fourth heater 32 positioned closest to the purge port 16 such that the amount is smaller than the electric power supplied to each of the first to third heaters 26, 28 and 30. With this arrangement, it is possible to reduce the rate of the fuel vapor desorption from a part of the adsorption material C positioned around the fourth heater 32, so that the ratio of fuel vapor desorption to time elapsed may become substantially equal to the ratio of desorption in each of the first to third heaters 26, 28 and 30 during the supply of the electric power. Therefore, the amount of fuel vapor supplied from the fuel vapor processing device 10 to the internal combustion engine may not be abruptly changed, and therefore, it is possible to inhibit an abrupt change in the air/fuel ratio of the fuel mixture supplied to the engine. As a result, it is possible to easily control the internal combustion engine so that it is efficiently driven during the purging operation of the fuel vapor processing device 10.

Figure 3:
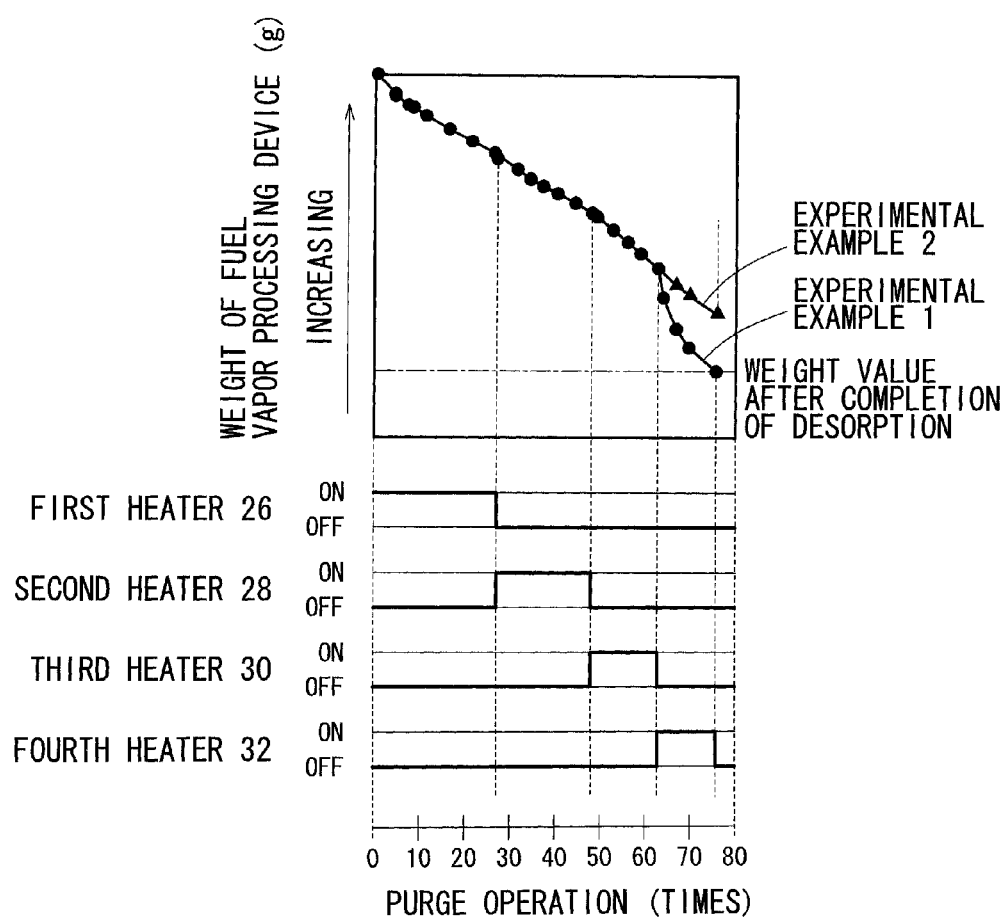
FIG. 3 is a graph similar to FIG. 2 but showing the relationship between the number of purging operations, the operation timings of heaters and the weight of the fuel vapor processing device for experimental example 1 and an experimental example 2.

With reference to FIG. 3, desorption of the fuel vapor when electric power supplied to the fourth electric heater 32 is smaller than that supplied to each of the first to the third heaters 26, 28 and 30 will now be described. In FIG. 3, the experimental example 1 is that same as shown in FIG. 2. An experimental example 2 shows the results of an experiment that was made using similar conditions as experimental example 1. With respect to the fourth heater 32, however, the amount of electric power was reduced to 15 W.

As shown in FIG. 3, reduction of electric power supplied to the fourth heater 32 from 60 W to 15 W has resulted in a decrease of the weight in the fuel vapor processing device 10 measured during the operation of the fourth heater 32. In other words, the rate and therefore amount of desorption of the fuel vapor was reduced. The difference between the amount of desorption of the fuel vapor during the operation of the fourth heater 32 and the amount of desorption of the fuel vapor during the operation of each of the first to third heaters 26, 28 and 30 was reduced or substantially eliminated. In this way, the concentration of the fuel vapor supplied from the fuel vapor processing device 10 to the engine was made to be substantially constant. Hence, it was possible to provide a generally consistent amount of desorbed fuel vapor by setting the electric power supplied to the fourth heater 32 at a smaller value. As a result, it was possible to inhibit an abrupt change in the air/fuel ration of the fuel mixture supplied to the internal combustion engine.

The above examples may be modified in various ways. For example, although the concentration sensors are used as a device for detecting the desorption condition in the above embodiments, it may be possible to use any other device as long as it can detect the desorption condition. Desorption of fuel vapor from the adsorption materials C is an endothermic reaction because it accompanies evaporation of fuel. Therefore, when a certain area in the adsorption material C, where desorption of fuel vapor occurs, is heated by the heater, increase of temperature at this part is inhibited, whereas such inhibition of increase of temperature may not be caused for a part of the adsorption material C, where desorption of fuel vapor has been completed. For this reason, it is possible to determine completion of desorption of fuel vapor from different parts of each adsorption material C by using temperature sensors that can detect temperature values of the adsorption materials C at positions where the adsorption material is heated by the heaters. Thus, change in temperature of the adsorption material C may provide a reliable indication for determining completion of desorption of fuel vapor. It is possible to accurately determine the completion of desorption of fuel vapor by using the temperature sensors.

In addition, the timings of the supply and termination of electric power to the heaters is preferably done through the use of desorption condition detecting devices. However, in place of the desorption condition detecting device, it is possible to use one or a plurality of timers for determining when and at what amount of electric power to supply to each heater. When a timer(s) is used, a preferred time and amount of electric power supplied to each heater may vary depending on the preferred outcome. In the case that the timer is used, an optimum period of time for heating by each of the heaters may preferably be measured previously, and the controller may control the heaters such that the electric power is in turn supplied to the heaters for their optimum periods of time. Use of the timer in place of the desorption condition detecting device may simplify the control of the controller, and therefore, reduce the manufacturing cost of the fuel vapor processing device.

Further, although four heaters are used in the previously discussed embodiments, any number of heaters may be used. Further, varying types of heaters may be used. For example, an elongated type of heater may be used wherein the heat along the single heater may be adjusted in its different locations to heat an adjacent layer of adsorption material C may be used. Heaters of varying shapes and sizes may be also used as needed. Further, although the supply of the electric power to one of the heaters is started at the same time the supply of the electric power to the previous one of the heaters is stopped, it may be possible that the supply of the electric power to one of the heaters is started a short time after the supply of the electric power to the previous one of the heaters is stopped. Alternatively, it may be possible to supply the electric power simultaneously to two or more of the heaters. For example, if the completion of desorption of fuel vapor has been determined based on the measured value of the first concentration sensor 36 during the supply of the electric power to the first heater 26, the supply of the electric power to the first heater 26 may be stopped after the supply of the electric power to the second heater 28 has started. In other embodiments non-adjacently located heaters may be heated at the same time. For example, first and third heaters may both be heated at a certain time while later the second and fourth heaters may be heated together. At a later time it is possible that the third and fourth heaters and/or just the fourth heater be activated. In certain embodiments, it may be preferred that heaters located towards the purge port be activated at an earlier stage than those located near the atmospheric port.

This invention claims:

1. A fuel vapor processing device comprising:
    a housing including a tank port communicating with a fuel tank, a purge port communicating with an intake air pipe of an internal combustion engine, and an atmospheric port communicating with an atmosphere;
    the housing filled with an adsorption material capable of adsorbing fuel vapor and allowing desorption of fuel vapor; and
    a plurality of heaters capable of heating the adsorption material;
    wherein the heaters are configured to be able to receive a supply of electric power separately from each other and arranged within the housing along a flow path of a fluid from the atmospheric port to the purge port;
    wherein during a purge operation, electric power is sequentially terminated from the heaters from the atmospheric port side to the purge port side; and
    wherein the electric power is supplied to the heaters in a sequential manner from the atmospheric port side to the purge port side.

2. The fuel vapor processing device as in claim 1, wherein the electric power supplied to a heater positioned closest to the purge port is smaller than the electric power supplied to the another heater.

3. The fuel vapor processing device of claim 1, further comprising a detecting device configured to detect a desorption condition of fuel vapor within the housing, and wherein timings of supplying the electric power and stopping the supply of the electric power to each of the heaters are determined based on the desorption condition detected by the detecting device.

4. The fuel vapor processing device of claim 3, wherein the detecting device comprises concentration sensors each capable of detecting a concentration of fuel vapor at a position around each of the heaters.

5. The fuel vapor processing device of claim 3, wherein the detecting device comprises temperature sensors each capable of detecting a temperature at a position around each of the heaters.

6. The fuel vapor processing device of claim 1, further comprising a timer that determines the supply and termination of electric power to each of the heaters.

7. The fuel vapor processing device of claim 1, wherein any two of the heaters do not simultaneously receive a supply of electric power.

8. The fuel vapor processing device of claim 1, wherein any two of the heaters simultaneously receive a supply of electric power.

9. A fuel vapor processing device comprising:
    a housing having a first port for the introduction of fuel vapor, a second port for introduction of negative pressure, and a third port communicating with the atmosphere;
    an adsorption material disposed within the housing,
    wherein a fuel vapor processing device is operable in an adsorption mode and a desorption mode;
    wherein in the adsorption mode, fuel vapor is adsorbed by the adsorption material as the fuel vapor flows through the housing from the first port and toward the third port,
    wherein in the desorption mode, fuel vapor adsorbed by the adsorption material is desorbed from the adsorption material as air flows into the housing via the third port and flows out of the second port;
    a plurality of heaters disposed within the housing and arranged along a path of flow of air from the third port to the second port in the desorption mode;
    a controller configured to control the heaters in the desorption mode, so that the heaters start to heat the adsorption material in a sequential manner in the air flow direction from the third port to the second port and terminate the heat to the adsorption material in the same sequential manner.

10. The fuel vapor processing device of claim 9, wherein the controller controls starts and stops each heater in accordance with a measured fuel vapor concentration value of the adsorption material located near such heater.

11. The fuel vapor processing device of claim 9, wherein the controller includes a timer for determining when to begin and terminate the heating of the heaters.

12. The fuel vapor processing device of claim 9, wherein the controller controls the heaters such that a close heater, which is a heater positioned closest to the second port, generates a first amount of heat that is smaller than a second amount of heat generated by each of the other heaters, the other heaters being those not positioned closest to the second port.

13. The fuel vapor processing device of claim 12, wherein other heaters generate substantially the same amount of heat as each other while the close heater generates an amount approximately one-half of the amount of heat produced by an other heater.

14. The fuel vapor processing device of claim 9, wherein the controller controls the heaters such that in two adjacently located heaters, the electric supply to one heater is terminated while the electric supply to the adjacent heater starts.

15. The fuel vapor processing device of claim 9, wherein the controller controls the heaters such that one heater starts to heat upon a predetermined time after an adjacently located heater is terminated.

16. A fuel vapor processing device comprising:
    a housing having an atmospheric port and a purge port;
    an adsorption material located between the atmospheric port and the purge port;
    a heater located adjacent to the adsorption material;
    the heater configured to supply heat to the adjacently located adsorption material;
    wherein the heat is supplied to an area of the adsorption material near the atmospheric port before the heat is supplied to an area of the adsorption material near the purge port; and
    wherein the heat supplied to the area of the adsorption material near the atmospheric port is terminated before the heat supplied to the area of the adsorption material near the purge port is terminated.

* * * * *